(12) United States Patent
VandeGeijn

(10) Patent No.: US 6,170,232 B1
(45) Date of Patent: Jan. 9, 2001

(54) QUICK-CHANGE COLLET CHUCK

(76) Inventor: Peter T. VandeGeijn, 312 Buck Cash Rd., Westminster, MD (US) 21158

( * ) Notice: Under 35 U.S.C. 154(b), the term of this patent shall be extended for 0 days.

(21) Appl. No.: 09/222,475

(22) Filed: Dec. 29, 1998

Related U.S. Application Data

(60) Provisional application No. 60/070,039, filed on Dec. 30, 1997.

(51) Int. Cl.[7] ........................................... B65B 7/28
(52) U.S. Cl. ........................ 53/331.5; 53/317; 279/409
(58) Field of Search ..................... 53/201, 317, 331.5, 53/353; 279/4.09, 50, 97; 403/349

(56) References Cited

U.S. PATENT DOCUMENTS

| | | | | |
|---|---|---|---|---|
| 1,502,528 | * | 7/1924 | Reulbach | 279/97 |
| 2,449,161 | * | 9/1948 | Craig | 53/317 |
| 2,483,660 | * | 10/1949 | Morrise | 279/97 |
| 2,683,040 | * | 7/1954 | Graham | 279/4.09 |
| 2,864,623 | * | 12/1958 | Spink | 279/4.09 |
| 4,347,660 | * | 9/1982 | Cannon | 279/4.09 |
| 4,906,147 | * | 3/1990 | Friesinger | 279/97 |
| 5,417,031 | * | 5/1995 | Bankuty | 53/331.5 |
| 5,868,533 | * | 2/1999 | Fiala | 279/97 |
| 5,884,450 | * | 3/1999 | Ronchi | 53/331.5 |

* cited by examiner

*Primary Examiner*—John Sipos
(74) *Attorney, Agent, or Firm*—Law Offices of Royal W. Craig

(57) ABSTRACT

An improved quick-change collet chuck used with an existing single lane capping apparatus for gripping and installing container caps during the automated high-volume filling and capping process. The quick-change collet chuck allows quick and effortless swapping out of different size jaw sets for different size caps and minimizes interruption and downtime during the automated container capping processes. The quick-change collet chuck has a slim profile for low inertia so as not to interfere with high speed operation and accurate servo torquing. Another optional feature is shown in conjunction with the quick-change collet chuck to facilitate reversible operation when it is desirable to include on-the-fly cap removal and removal torque testing on the capping machine. This feature insures that the collet chuck cannot unscrew or spin loose from the spindle shaft after the quick-change collet is already locked in position.

10 Claims, 20 Drawing Sheets

QUICK-CHANGE COLLET CHUCK

CROSS-REFERENCE TO RELATED APPLICATIONS

Priority of the present application is based on provisional application No. 60/070,039 filed Dec. 30, 1997.

BACKGROUND OF THE INVENTION

1. Field of the invention

The present invention relates to chucks for gripping workpieces and, more particularly, to a quick-change collet chuck for gripping and installing container caps during an automated high-volume filling and capping process.

2. Description of the Background

The filling and capping process generally entails supplying containers along a conveyor, automatically filling them at a filling station, and automatically capping them at a capping station. Various testing and control functions may be performed along the way, e.g., testing and control of fill volume, cap torque, conveyor velocity, etc. The apparatus which performs the process must be capable of accommodating a wide variety of containers and caps (both caps and containers may vary in size and shape), and this is accomplished by a universal chuck which allows quick and easy grasping and manipulation of different cap sizes.

Current common methodology for screw cap positioning and torquing include the following types of chucks:

Tapered Chuck

Friction Disk Chuck

Donut Chuck

Segmented Chuck

The action of the Tapered Chuck and the Friction Disk chucks is to apply axial (downward) force to generate the friction drive between the cap top (rim) and the chuck taper or friction disk. Having to avoid damage to the container, cap, and/or thread the axial force is limited. Thus tapered chucks and friction disc chucks can only handle a limited type of caps in relatively low torque applications which severely restricts the usage of these chucks. Another disadvantage of these chucks is their possible contamination by their own (or from the caps) particulates. Shavings may prevent required torque transfer since the driving axial force is limited in order not to damage the container and/or thread. These shavings can cause slippage that will perpetuate the problem. Simple friction drives such as the Tapered Chuck and the Friction Disk Chuck are not desirable in pharmaceutical clean packaging environments due to potential particulate generation from slippage.

The Donut Chuck includes a urethane ring (open center diameter matched in size to the cap) that, when a concentric cylinder is actuated, swells inward to clamp (radial pressure) on the outside of the cap thus enabling torque transfer as required. This is a friction drive but the friction force is generated not by axial but by a radial force compressing the cap. Normally this allows for a significantly higher torque range compared to the simple friction drives mentioned above. No axial force to risk the damage of the container or threads. However, there are a significant number of parts to be changed when changing from one cap size to another, enough that often the complete chuck is exchanged. Besides the tool requirement to do this, there is significant cost involved. The Donut Chuck has a working torque range good for up to medium (average) torque requirements (The particulate generation is minimal due to the clamping force being well in excess to what is required for transfer of the normal required torque thus resulting in no slippage between the cap and the donut).

The Segmented Chuck concept is specifically for the high torque range caps that typically have more severe serrations or other significant protrusions on the outside cap (radial) surface. The segmented chuck may, for instance, include a 3 piece segmented chuck jaw set (each segment occupying 120 degrees). However, this 3 piece segmented design is very heavy and clumsy, and it suffers from somewhat unstable jaw segments. In addition, the multi-segmented jaw set concept is very expensive to manufacture, and it does not lend itself to quick changing for different size caps. The chuck jaws are designed to match the cap outside profile and by a true interlock (when the jaws close) to facilitate positive (i.e. non-friction) drive for high torque requirements. Due to the expensive segmented die jaws concept of positive locking being very different from the Donut Chuck friction concept, this chuck does not lend itself economically to any simple applications. Again the change parts are enough trouble that for each cap size a complete new chuck is the practical solution. A whole chuck (inclusive of jaws) needs to be changed. Moreover, the mass of the three piece segmented chuck results in a high inertia which interferes with high speed operation. The chuck is servo driven and the servo motor provides positive feedback on the power required to turn/torque the cap. The high inertia of the chuck contaminates this data and limits the torquing speeds (and the overall production rates). A lower inertia results in more accurate torquing and higher production speeds.

It would be a great advantage to have a quick-change low-inertia collet-type chuck to allow quick and effortless swapping out of different size jaw sets for different size caps.

The Collet Chuck concept of a universal chuck to actuate a quick-change one-part collet as the only change part is far superior to the Donut Chuck and the Segmented Jaw Chuck since collets can be made to work the whole working range of these other two chucks. A low cost urethane lined collet will drive the caps with lower torque requirements. A machined contact profile collet will drive the caps with high torque requirements (positive interlocking with the external cap profile). Even asymmetric caps could be clamped in custom collets without requiring a special chuck change (The collet orientation relative to the chuck is always an exact repeat and servo drive allows an exact chuck orientation repeat). Preferably, there should be virtually no down time (or skill level) associated with the collet change.

SUMMARY OF THE INVENTION

It is, therefore, an object of the present invention to provide an improved quick-change collet chuck for use in handling virtually any work piece.

It is a more specific object to provide a quick-change collet chuck to allow quick and effortless swapping out of different size jaw sets for different size caps while minimizing any interruption of the container capping process.

It is still another object to provide a quick-change collet chuck which incorporates a unitary jaw set for increased durability and reliability, lower manufacturing cost, and greater ease of handling.

It is a further object to provide a chuck as described above with the lowest inertia possible so as not to interfere with high speed operation and accurate servo torquing.

It is still another object to insure that the collet chuck cannot unscrew or spin loose from the spindle shaft after the quick-change collet is already locked in position, thereby facilitating reversible operation when it is desirable to include cap removal and removal torque testing on the capping machine.

Additional objects include stainless construction and a no-tools quick-change design.

In accordance with the above objects, an improved quick-change collet chuck is described for use in an existing single lane capping apparatus for gripping and installing container caps during the automated high-volume filling and capping process. The quick-change collet chuck allows quick and effortless swapping out of different size jaw sets for different size caps while minimizing interruption and down time of the automated container capping processes. The quick-change collet chuck has a slim profile for low inertia so as not to interfere with high speed operation and accurate servo-torquing. Another feature is shown in conjunction with the quick-change collet chuck to facilitate reversible operation when it is desirable to include cap removal and removal torque testing on the capping machine. This feature insures that the collet chuck and collet cannot unscrew or spin loose from the spindle shaft after the quick-change collet is already locked in position. It would be a great advantage to have a quick-change low-inertia collet-type chuck to allow quick and effortless swapping out of different size jaw sets for different size caps.

The quick change collet chuck of the present invention was specifically developed for cap positioning and torquing in pharmaceutical Clean Room Class 100, although it should be understood that the inventive concept may apply in many other contexts. The Class 100 refers to the quantity of particles permitted (in the exposed product zone): 100 particles per cubic foot between the 0.5 micron and 5-micron size. This means special clothing and gloves for operators to reduce particulate generation. This aspect comes into play in the chuck design as well. The major source of particulate generation in the typical Clean Room is the human operator. Any unnecessary movements by the operator/mechanic in a Class 100 room results in (relatively) huge particulate generation. Simple, light, no-tools quick-change tooling is an extremely effective way of avoiding this type of particulate generation. For changeover the "J" lock in the present chuck is as simple as can be: push, twist by ⅛ turn, let go.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
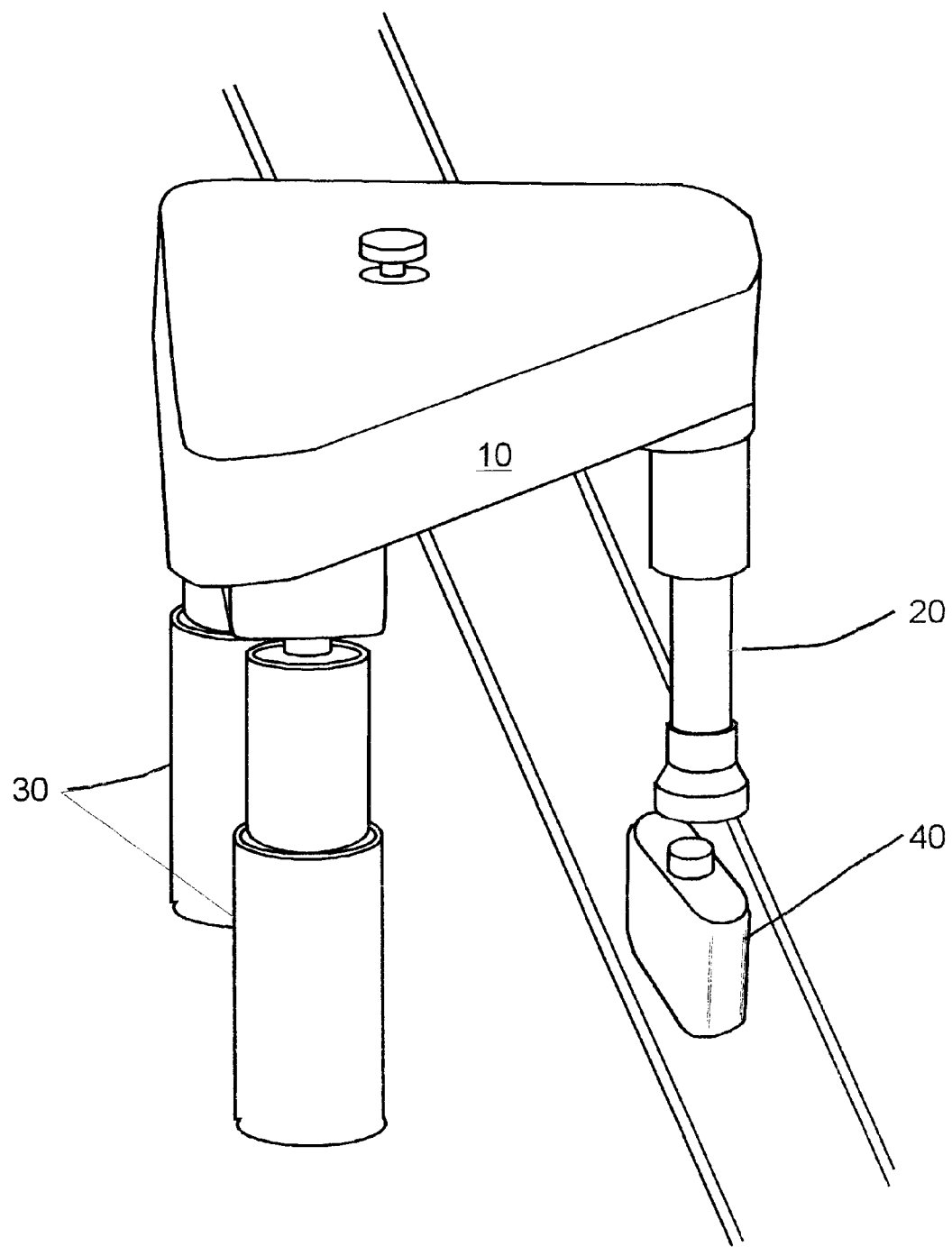
FIG. 1 is a perspective view of an existing single lane capping apparatus 10 incorporating a quick-change collet chuck 20 according to the present invention for gripping and installing container caps during the automated high-volume filling and capping process.

FIG. 1 is a perspective view of an existing single lane capping apparatus 10 incorporating a quick-change collet chuck 20 according to the present invention for gripping and installing container caps during the automated high-volume filling and capping process. Bottles 40 or other containers are urged along a conveyor to a capping position. The capping apparatus 10 is supported on adjustable air pistons 30, and it extends the quick-change collet chuck 20 downward toward the bottle 40.

Figure 2:
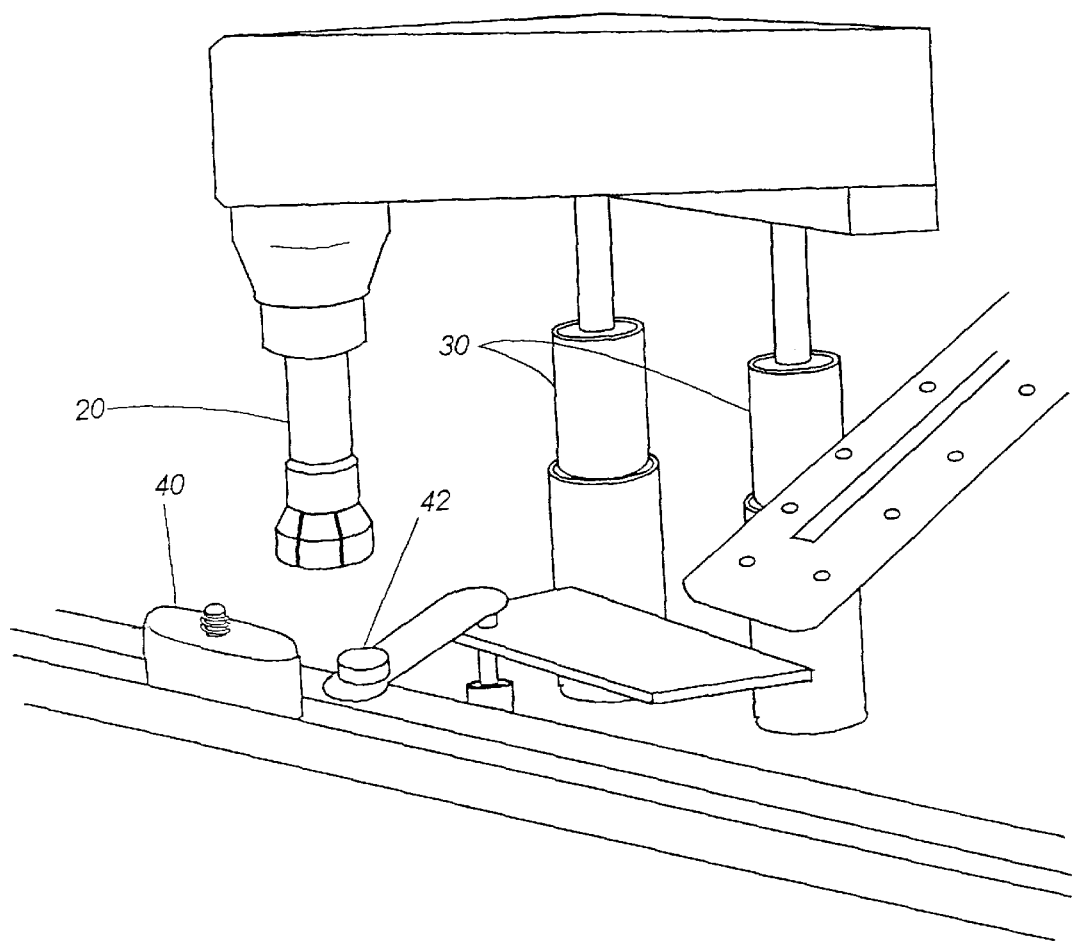
FIG. 2 is a side view of the single lane capping apparatus 10 with quick-change collet chuck 20 of FIG. 1.

FIG. 2 is a side view of the single lane capping apparatus 10 with quick-change collet chuck 20 of FIG. 1. During a capping maneuver, a cap 42 is rotated into position on a pivoting arm 44 and upwardly presented into the open quick-change collet chuck 20. Bottle cap 42 is clamped within the jaws of the collet 22 inserted in quick-change collet chuck 20. Once the bottle is properly positioned, the capping apparatus 10 extends the quick-change collet chuck 20 downward to seat the bottle cap 42 on the neck of the bottle 40, and then rotates the collet chuck 20 to screw the bottle cap 42 onto the neck of bottle 40. All movements of the capping apparatus 10 are electronically controlled in accordance with pressure/torque feedback to insure that the cap 42 is properly seated and screwed onto the bottle 40.

Figure 3:
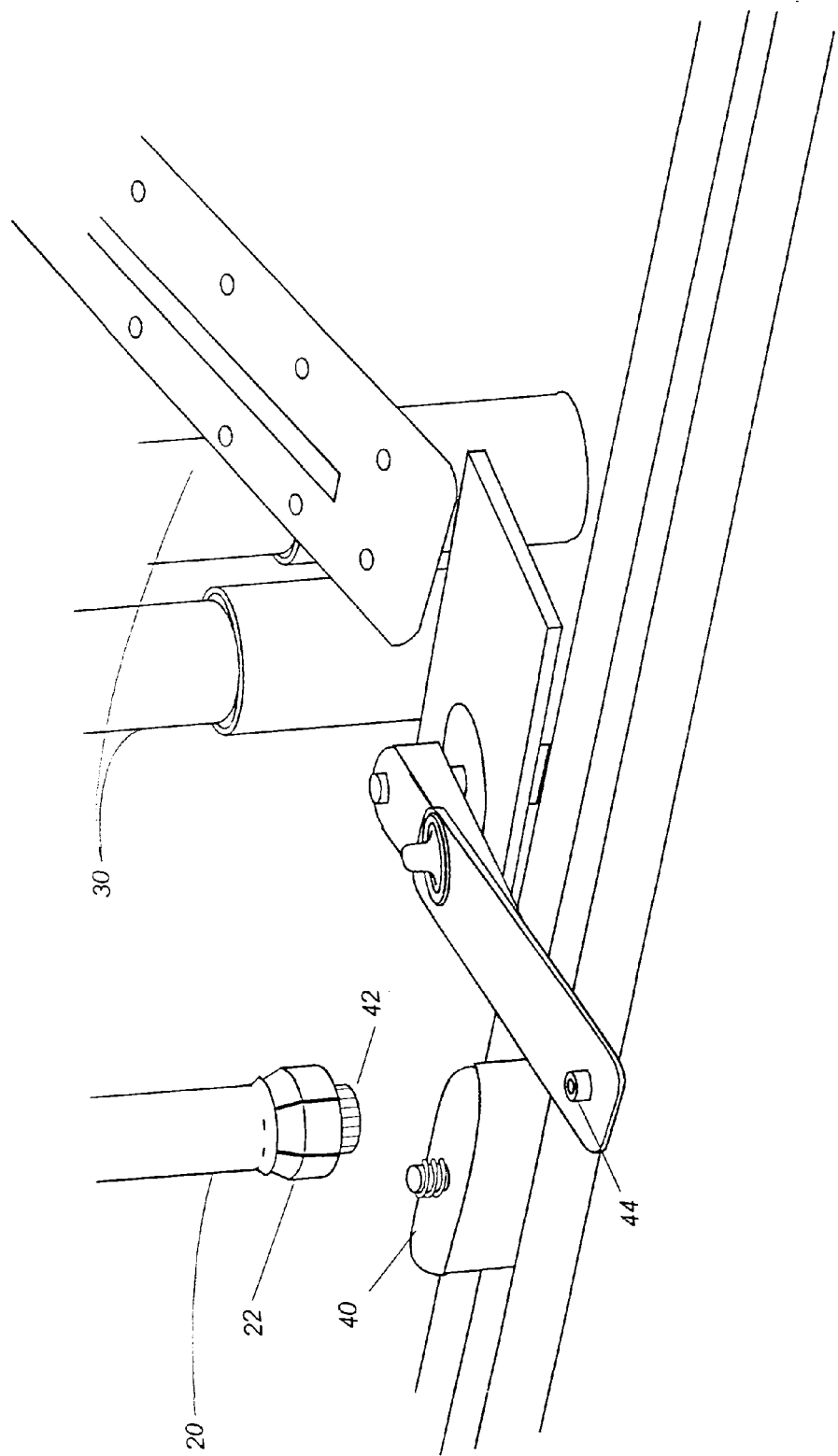
FIG. 3 is a side close-up view of the quick-change collet chuck 20 of FIGS. 1 and 2.

FIG. 3 is a side close-up view of the quick-change collet chuck 20 of FIGS. 1 and 2. In the illustrated position, a cap 42 has been lifted by pivoting arm 44 and is held in the grip of the collet 22 prior to placement on the neck of bottle 40

(the arm 44 is rotated out of harm's way prior to the chuck lowering to place the cap 42 on the bottle 40).

Figure 4:
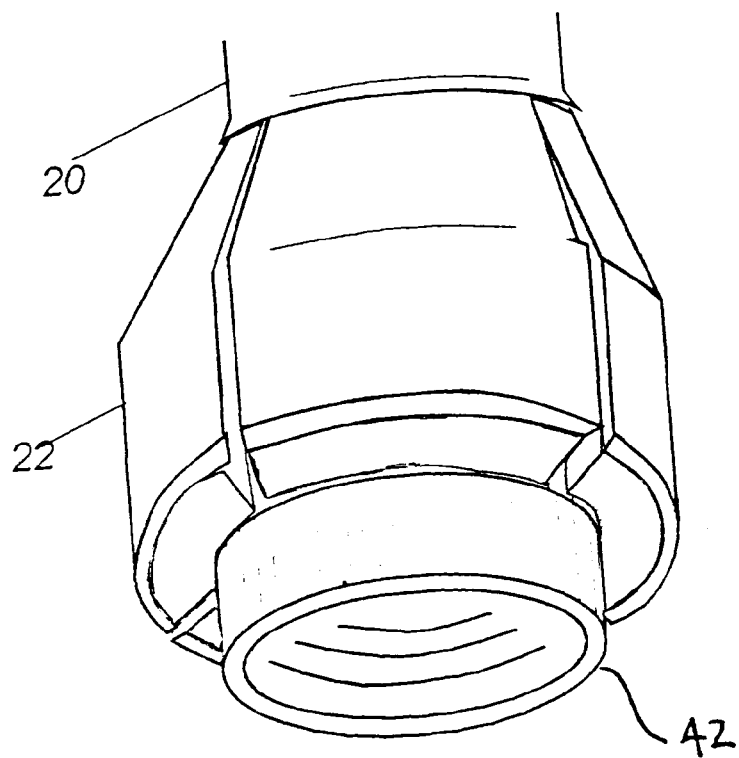
FIG. 4 is an upwardly directed close-up view of the quick-change collet chuck 20 of FIGS. 1–3.
Figure 4:
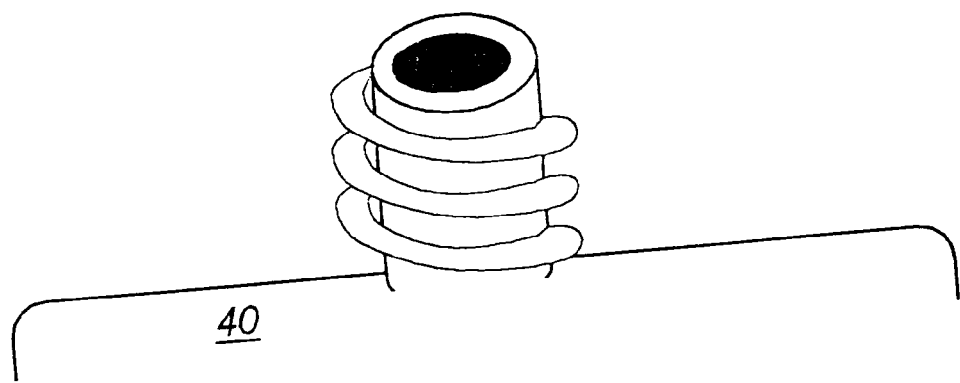

FIG. 4 is an upwardly directed close-up view of the quick-change collet chuck 20 of FIGS. 1–3. Again, cap 42 has been lifted up by arm 44 and is held in the grip of the collet 22 prior to placement on the neck of bottle 40.

Figure 5:
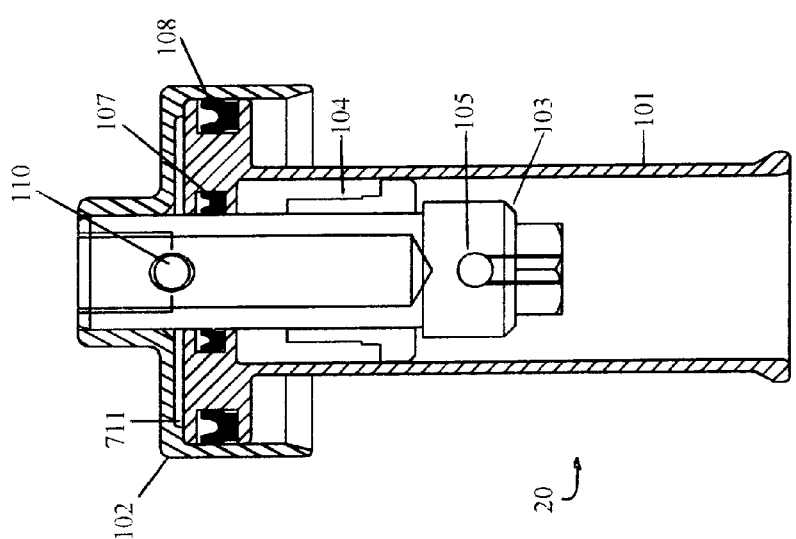
FIG. 5 is a side sectional view of the quick-change collet chuck 20 of FIGS. 1–4 without collet 22.

FIG. 5 is a side sectional view of the quick-change collet chuck 20 without collet 22.

Figure 6:
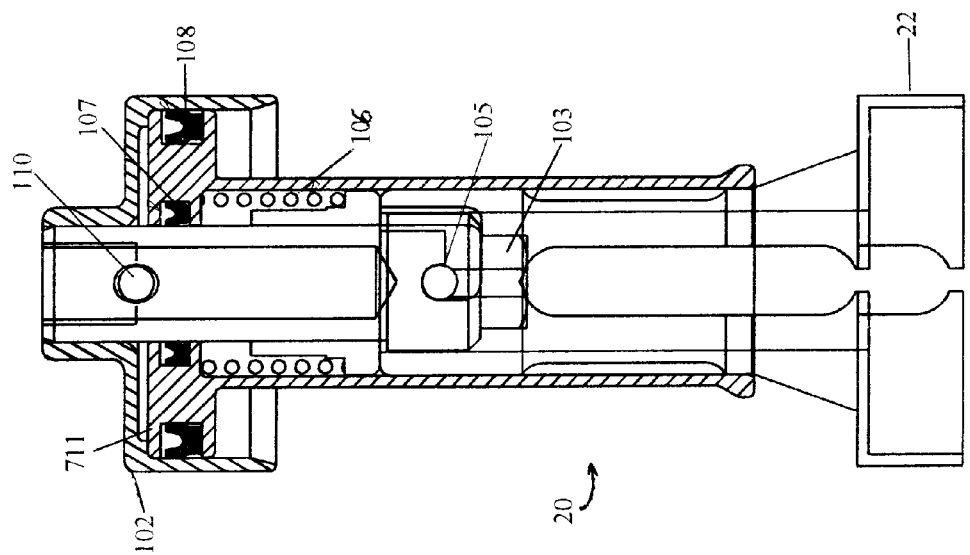
FIG. 6 is a side sectional view of the quick-change collet chuck 20 with collet 22.

FIG. 6 is a side sectional view of the quick-change collet chuck 20 of FIGS. 1–5 with collet 22 inserted therein. The collet 22 is a generally cylindrical unitary member formed with an upper mounting collar, a downwardly flared mid section, and a lower cap gripping section. The downwardly flared mid section and lower cap gripping section are interrupted by a plurality of longitudinal notches which give the cap gripping section the ability to expand or contract to release/grip a bottle cap inserted therein.

With reference to FIGS. 5 and 6, the chuck consists of the Shaft 103 that connects with the hollow drive shaft supplied with the existing capping apparatus 10. Shaft 103 is drilled laterally toward its lower extremity to receive a pin 105. Preferably, a stepped pin 105 is used to ensure unique orientation as will be described. Quick-release collet 22 is inserted over the end of shaft 103 and is captured by pin 105, thereby retaining the collet 22. Shaft 103 is formed with a deep central bore (dotted lines) to bring an external air supply inside the collet chuck 20, and the upper end of Shaft 103 is drilled laterally to provide an air passage 110 for bleeding air through the central bore. The air supply is directed into a cavity 711 existing between a Bell 102 and the face is of Piston 101. When the air supply is activated the cavity 711 is pressurized and piston 101 is urged downward. A Bushing 104 is slipped over Shaft 103, and this may be formed of Delrin plastic or other suitable bushing material. As seen in FIG. 6, Bushing 104 serves to retain a compression spring 106 that is required for return of piston 101 (after the air pressure is removed). Bushing 104 also serves as a guide for piston 101 to prevent racking and serves as a pressure pad for latching the quick-release collet 22.

Piston 101 comprises an upper disk with a unitary extension sleeve protruding downwardly. The disk of piston 101 is machined with an inner O-ring groove for housing an inner O-ring 107 (or alternatively, a cup seal) that seals against the Shaft 103, and with an outer O-ring groove for housing an outer O-ring 108 that seals against the inner wall of a Bell 102. The inside bore of the extension sleeve of Piston 101 also serves as a guide surface for the Bushing 104 to prevent racking of the piston. The Bell 102 serves as the piston gland and wall.

The action of the quick-change collet chuck 20 is as follows. Air pressure from an external source is applied though air passage 110 and through the upper bore in Shaft 103, and air trapped in the cavity 711 between the Bell 102 and Piston 101 face forces the Piston 101 downward. The sleeve of the Piston 101 transfers the force produced to the downwardly flared mid section of collet 22. As the Piston 101 is forced out, the annular lower lip of the Piston 101 sleeve forces the collet 22 to flex inward (contract) as it slides along the flared mid section of collet 22. Once the air pressure is removed, the return spring 106 forces the Piston 101 upward until it reseats against the limiting wall of Bell 102, and the collet 22 is allowed to flex open again as the sleeve retracts off the flared mid section of collet 22.

Figure 8:
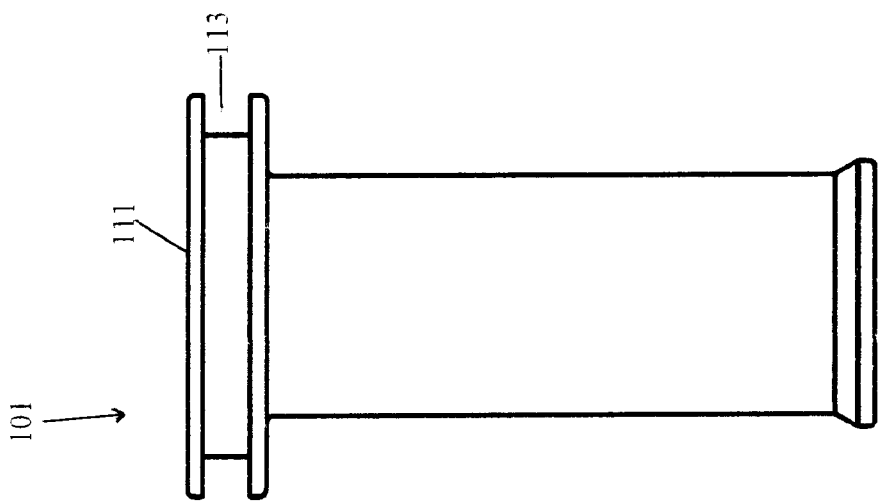
FIGS. 7, 8 and 9 are a side sectional view, a side perspective view, and a top view, respectively, of Piston 101.
Figure 7:
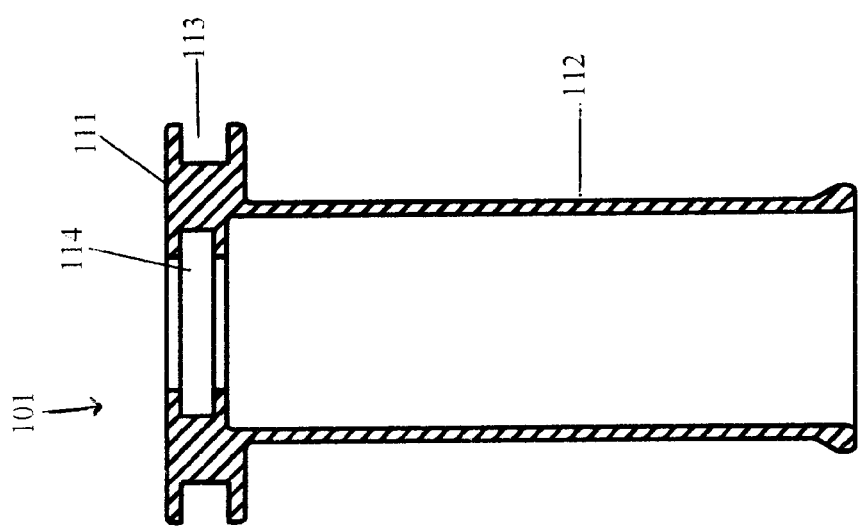
Figure 9:
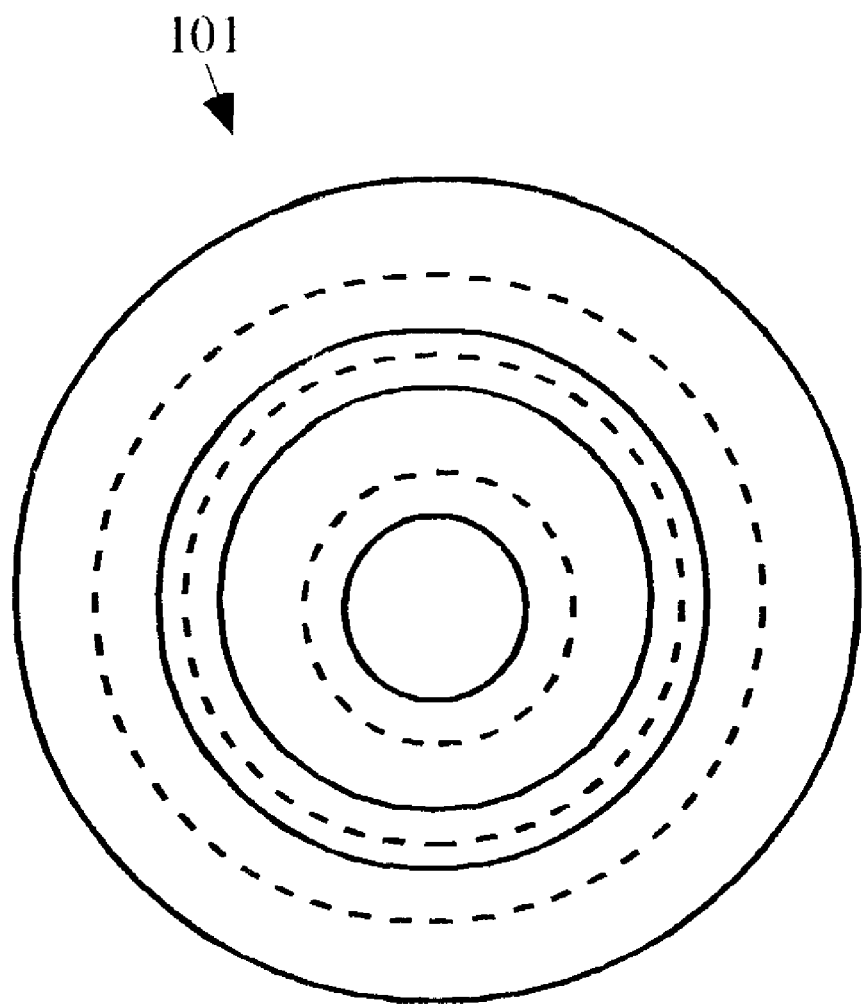
Figure 11:
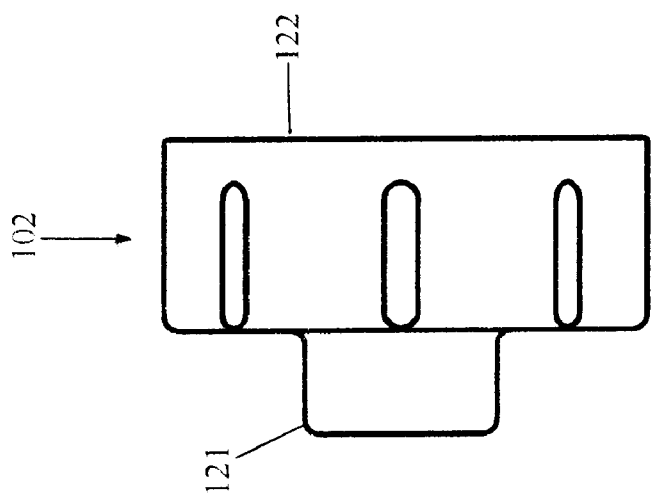
FIGS. 10, 11, 12 and 13 are a side sectional view, a side perspective view, a bottom view, and a top view, respectively, of the Bell 102 which serves as the piston gland and wall.
Figure 10:
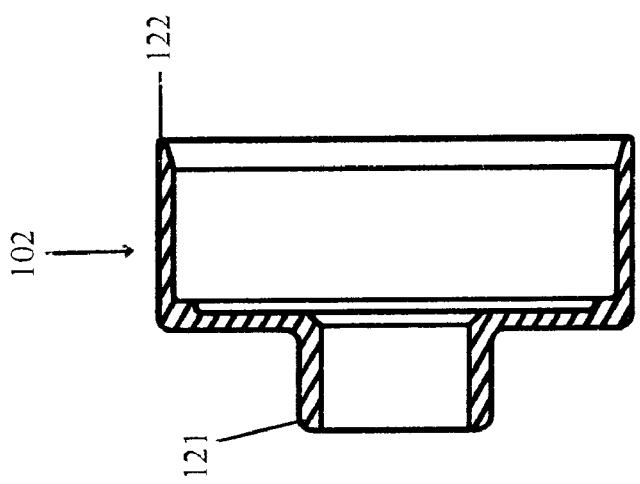
Figure 13:
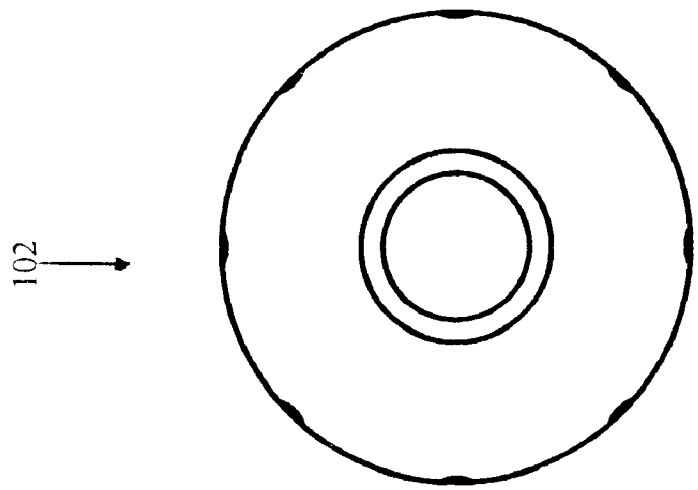
Figure 12:
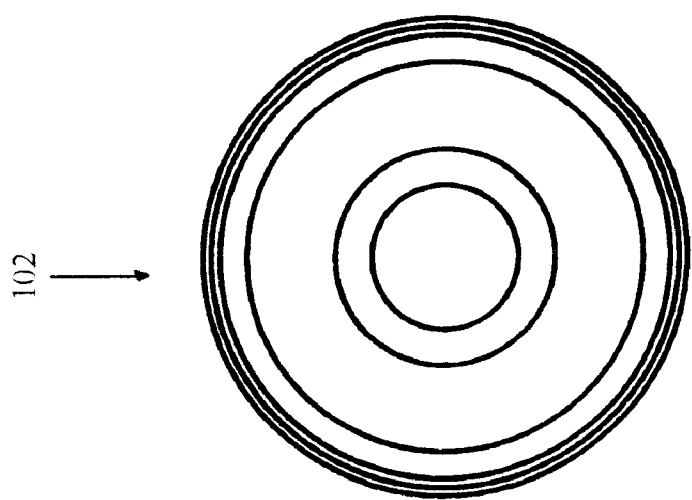

FIGS. 7, 8 and 9 are a side sectional view, a side perspective view, and a top view, respectively, of Piston 10 1 showing the upper disk 111 with unitary extension sleeve 112 protruding downwardly. Again, the disk 111 of piston 101 is machined with an inner O-ring groove 114 for housing inner O-ring 107, and an outer O-ring groove 113 for housing outer O-ring 108. The inside bore of the extension sleeve 112 of Piston 101 is a smooth and uniform guide surface for Bushing 104, and the bottom rim is thicker and rounded to provide a bearing surface.

FIGS. 10, 11, 12 and 13 are a side sectional view, a side perspective view, a top view, and a bottom view, respectively, of the Bell 102 which serves as the piston gland and wall. Bell 102 is a generally cylindrical hollow cap which covers and seals the upper end of Piston 101. Bell 102 is formed with a reduced-diameter neck 121 having a central through-bore for receiving Shaft 103. The other end is an expanded collar 122 having a smooth inner wall for slidable insertion onto the upper end of Piston 101 and over O-ring 108.

Figure 15:
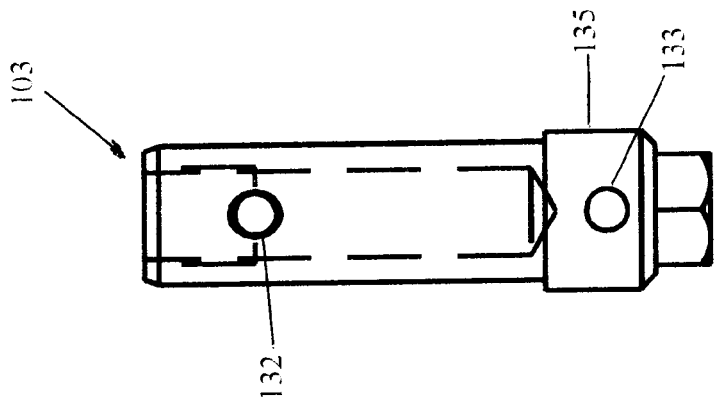
FIGS. 14, 15, 16, 17 and 18 are a side sectional view, a side sectional view rotated by 90 degrees, a side perspective view, a bottom view, and a top view, respectively, of the Shaft 103.
Figure 14:
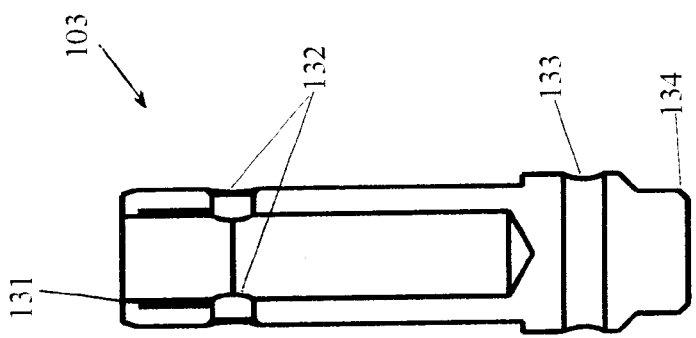
Figure 17:
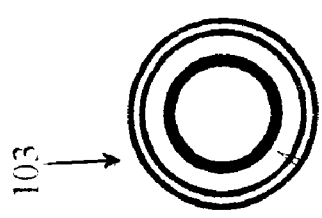
Figure 18:
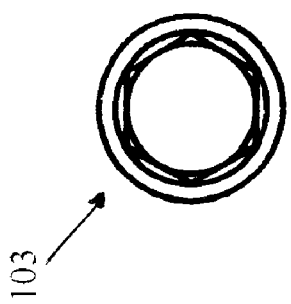
Figure 16:
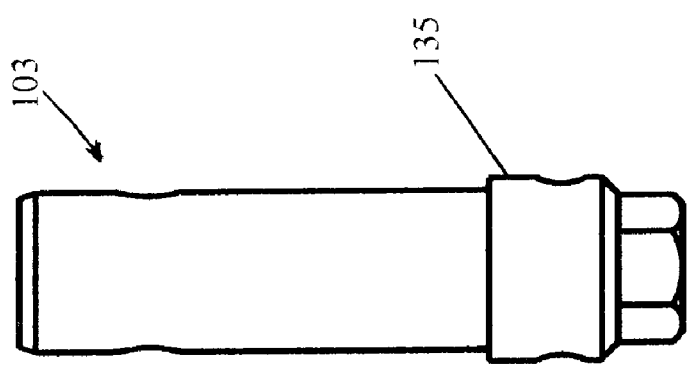

FIGS. 14, 15, 16, 17 and 18 are a side sectional view, a side sectional view rotated by 90 degrees, a side perspective view, a bottom view, and a top view, respectively, of the Shaft 103. Shaft 103 is a generally cylindrical member that is drilled lengthwise to form a central air passage 131, the mouth of which connects with a hollow drive shaft supplied with the existing capping apparatus 10. Shaft 103 is also drilled to form a lateral bore 133 toward its lower extremity to receive pin 105. Shaft 103 is also drilled to form an upper lateral bore 132 toward its upper extremity. Upper bore 132 communicates with the central passage 131 to bleed air outwardly. In operation, Bushing 104 is inserted over the Shaft 103. As seen in FIGS. 15 and 16, shaft 103 is formed with a raised section 135 around the lateral bore 133 for reinforcement of the pin to be inserted therein and to provide a stop for Bushing 104.

Figure 20:
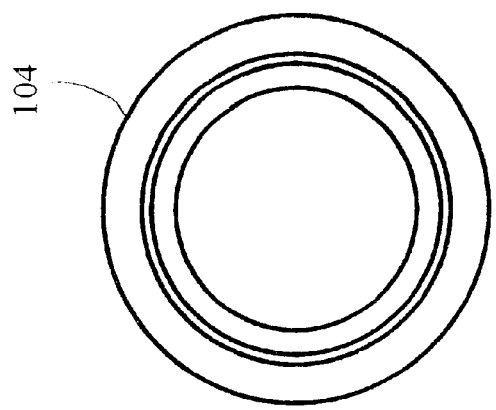
FIGS. 19 and 20 are a side sectional view, and a top view, respectively, of the Bushing 104.
Figure 19:
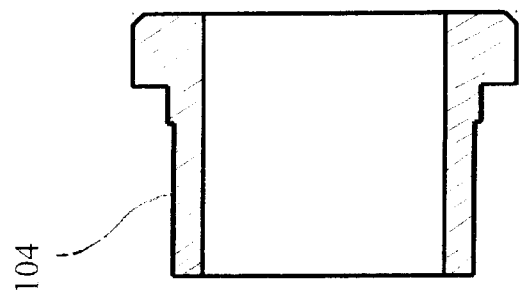

FIGS. 19 and 20 are a side sectional view and a top view, respectively, of the Bushing 104. Bushing 104 is formed in the shape of a cylindrical collar with protruding lower flange and is made of Delrin plastic or other suitable material. Bushing 104 is sized for insertion over the Shaft 103 and serves to retain compression spring 106. Bushing 104 also serves as a guide for piston 101 to prevent racking and serves as a pressure pad for latching the quick-release collet 22.

Figure 21:
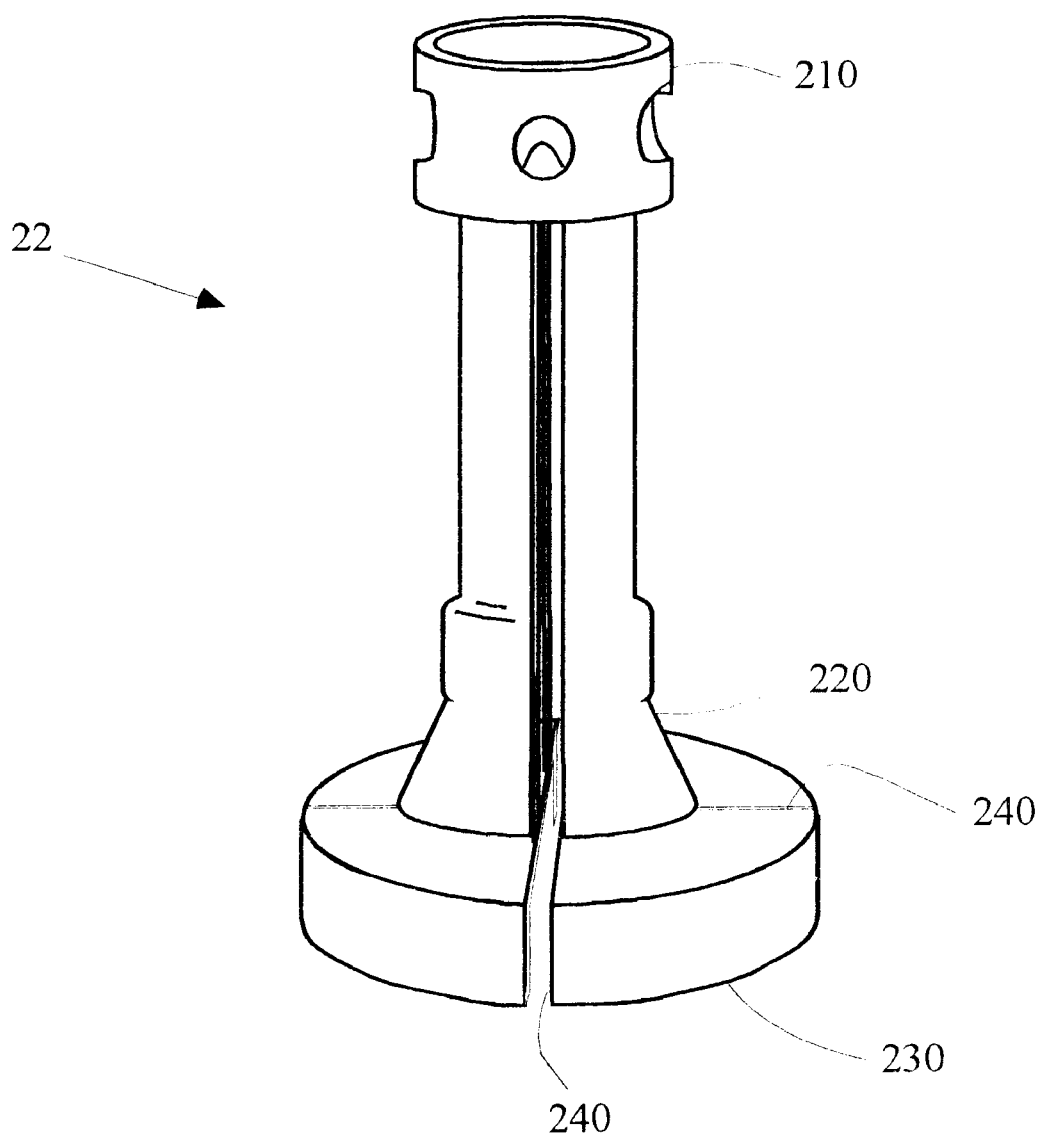
FIGS. 21, 22, 23, 24, 25, 26, 27 and 28 are a front perspective view, a close-up perspective view at the top, a close-up perspective view at the bottom, a side sectional view, a side perspective view, a side sectional view rotated by 90 degrees, a top view, and a bottom view, respectively, of the collet 22 according to one embodiment of the present invention.

FIG. 21 is a front perspective view of the quicl-release collet 22 according to one embodiment of the present invention. The collet 22 is a generally cylindrical unitary member formed with an upper mounting collar 210, a downwardly flared mid section 220, and a lower cap gripping section 230. The downwardly flared mid section 220 and lower cap gripping section 230 are interrupted by a plurality of longitudinal notches 240 which give the cap gripping section 230 the ability to expand or contract to release/grip a bottle cap inserted therein.

Figure 22:
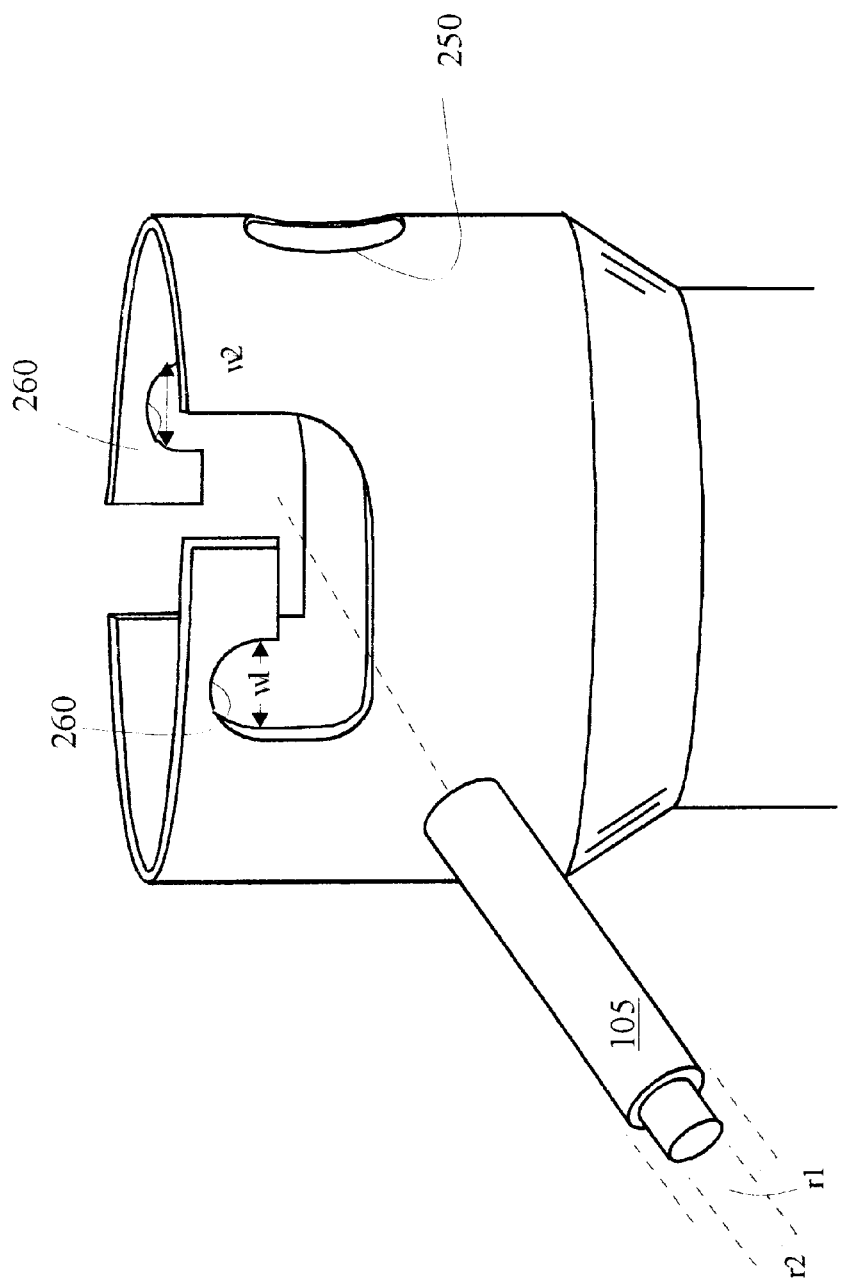

FIG. 22 is a close-up side perspective view of the upper mounting collar 210 of collet 22. Upper mounting collar 210 is formed with a lateral through-bore 250, and with opposing hooked or "J-lock" mounting channels 260 for effecting the quick-change feature. Each of the J-lock mounting channels 260 has an open mouth leading to a closed hook. The stepped pin 105 comprises a cylindrical main section having a larger diameter r1, and a cylindrical end section having a slightly smaller diameter r2. This stepped pin configuration is used in conjunction with two differently-sized J-lock mounting channels 260 to ensure a unique orientation of the pin 105. Specifically, the closed hook of one J-lock mounting channel 260 is formed with a larger diameter w1 that conforms to the diameter R1 of the main section of pin 105, while the opposing J-lock mounting channel 260 is formed with a smaller diameter w2 that conforms to the diameter r2 of the end section of pin 105. This way, after the pin 105 has been inserted through the open mouths of both J-lock mounting channels 260, the collet 22 can only be twisted to properly seat the stepped pin 105 in the closed hooks if the two differently-sized J-lock mounting channels 260 are properly oriented with respect to the two sections of pin 105. This ensures the proper orientation.

In operation, and with additional reference back to FIG. 6, pin 105 is inserted through the shaft 103. The quick-release collet 22 is then inserted over the end of shaft 103 until the ends of pin 105 enter the mouths of the J-lock mounting channel 260 of collet 22. The collet 22 is rotated and the ends of pin 105 are guided around and into the hooks of channels 260 and become captive therein, thereby retaining the collet 22. All the while, the chuck piston return spring 106 doubles as a latching spring for the collet 22, e.g., chuck piston return spring 106 exerts a downward pressure on collet 22 and insures that the mounting channel 260 remains hooked on pin 105. Once the chuck cylinder is pressurized, the force it produces will re-enforce the latching action of spring 106 and the collet is positively retained. Once the pressure is removed from the chuck, the collet 22 is easily and manually removed by ⅛-turn push-turn-pull motion. This is ideal because the collet change does not require tools, time, or thought, and it avoids loose parts which can be lost or misplaced.

Figure 23:
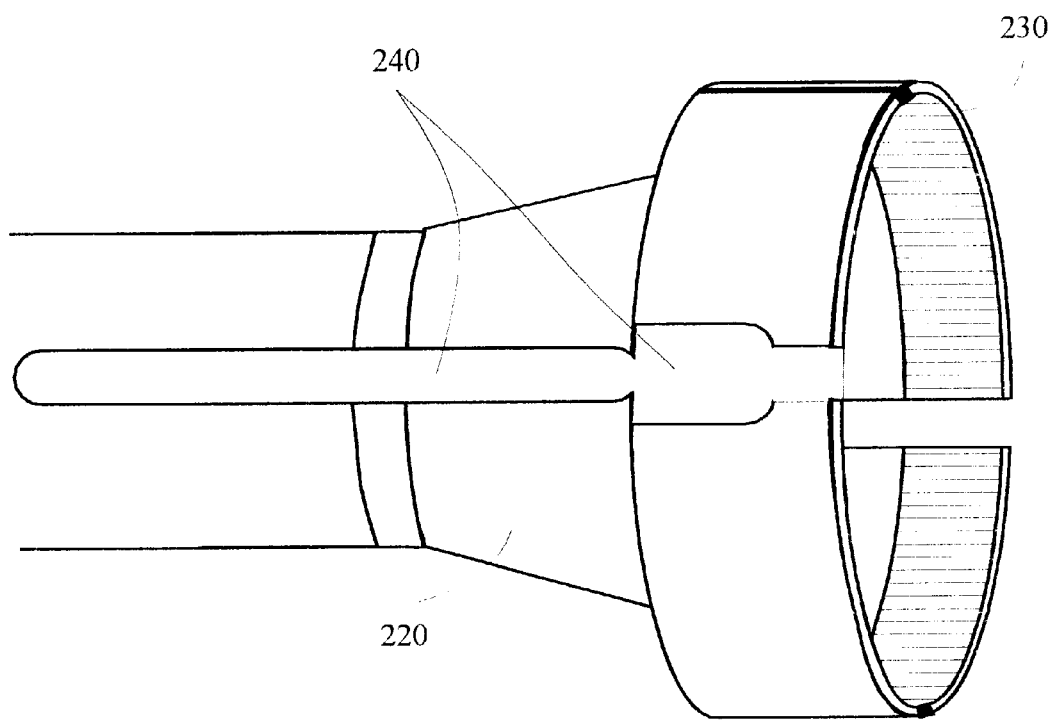
Figure 25:
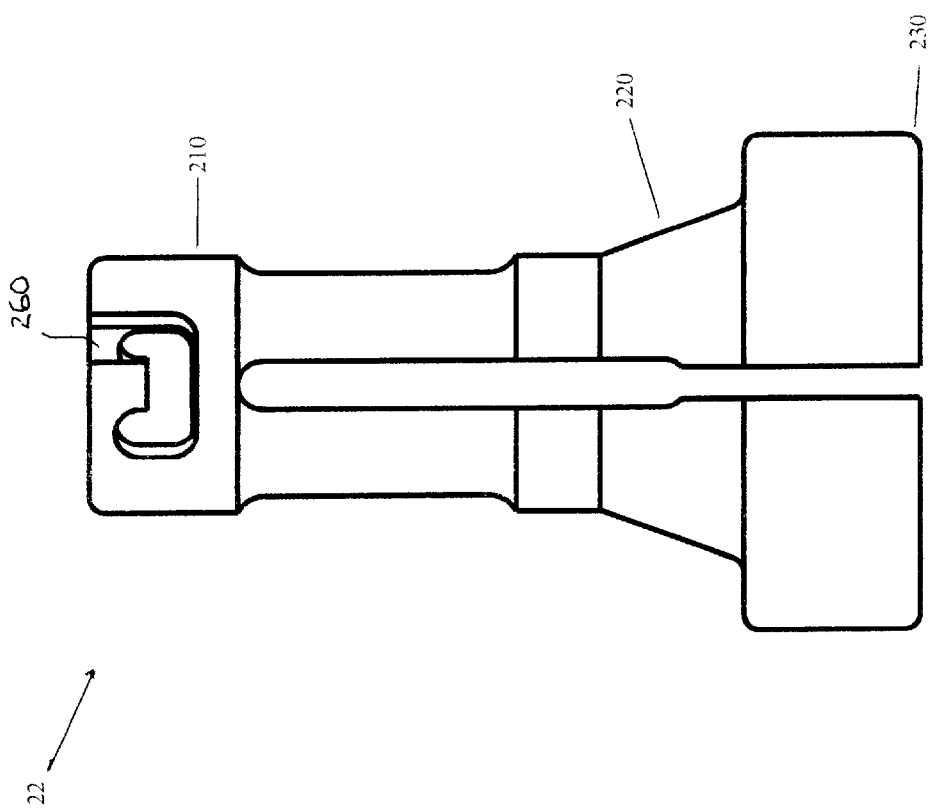
Figure 24:
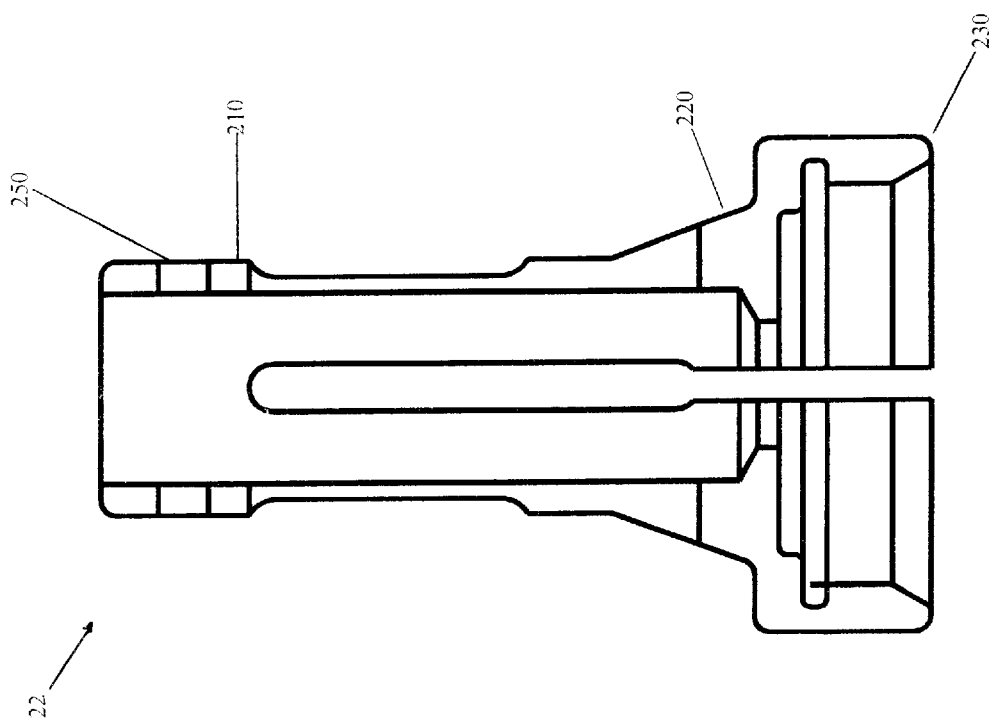
Figure 27:
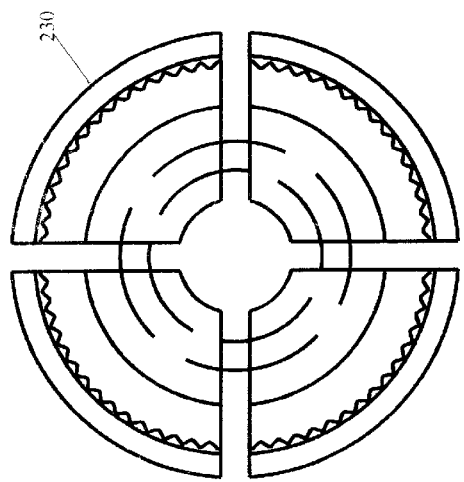
Figure 28:
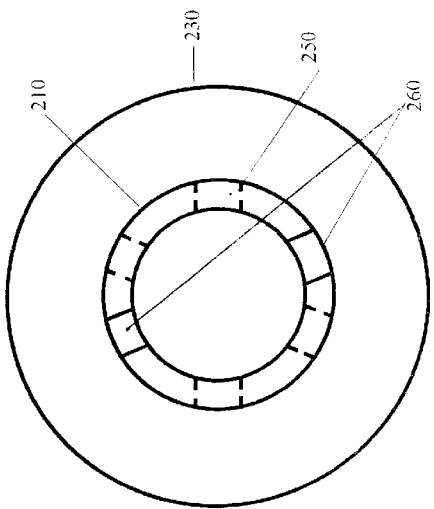
Figure 26:
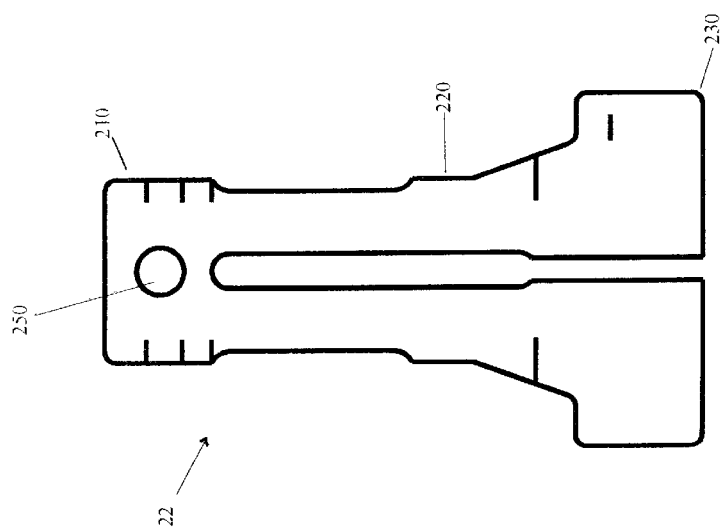

FIG. 23 is a side close-up perspective view of the lower cap gripping section 230 of collet 22 according to one embodiment of the present invention. As is known in the art, the inner jaws of the lower cap gripping section 230 may be serrated as shown, or they may be lined with a rubber gripping material as desired depending on the particular caps to be installed.

FIGS. 24, 25, 26, 27 and 28 are a side sectional view, a side perspective view, a side perspective view rotated by 90 degrees, a top view, and a bottom view, respectively, of the collet 22 according to the present invention. It is that noteworthy that the design of the above-described collet chuck 20 insures that the Shaft 103 remains fully behind the collet 22 thus allowing a smaller piston inside diameter. Using lateral through-bore 250 and J-lock mounting channel 260 for effecting the quick-change feature, the built-in concentric chuck cylinder is behind the collet 22 rather than around it. Consequently, the "flywheel" effect (rotational momentum) is minimized by keeping the mass as close to the rotational axis as possible. The inertia is calculated as proportional to $MR^2$ (mass x radius squared). Calculations indicate that the inertia of the present QuickChange Collet Chuck design is 27% of competing segmented jaw chucks, and the mass is only 40%. This very low inertia becomes very important in achieving high production rates with accurate application torque. Most screw caps are applied in 1½ to 2½ turns. The fastest most accurate application algorithm for cap torquing is to use a servo motor to rotate the cap at high speed for the first (approximately) 1¼ turn and than abruptly slow to low speed to finish the torquing accurately (better resolution). The servo motor is capable of giving feedback of the current required to rotate the cap at any instant of time. Any large inertia contaminates this feedback information since it no longer only represents the power required to turn the cap at the low speed. If the cap is fully torqued at exactly 1½ turns the flywheel effect can easily skew the feedback (in comparison to 2½ turns with 1 full turn at low speed). To achieve the higher production rates the initial high rotational speed is crucial. This all boils down into a need for low inertia of all rotating mass, and the present invention meets the need. The outside diameter will be small as well, keeping the inertia low. The lower inertia results in more accurate torquing and higher production speeds because there is less interference with high speed operation and feedback power reading of the servo motor.

Figure 29:
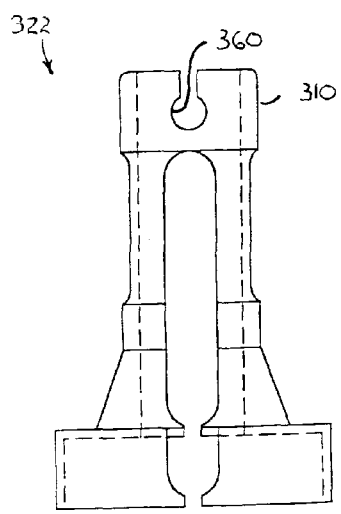
FIG. 29 is a profile drawing illustrating another embodiment of collet 22 in which the hook of channel 20 is eliminated.

FIG. 29 is a profile drawing illustrating a second embodiment of collet 322 in which the hook or J-lock design of channel 20 is eliminated. The J-lock is not necessary with the use of a modified 2-position slide release pin as will be described, yet this also accomplishes the quick-release feature.

Figure 30:
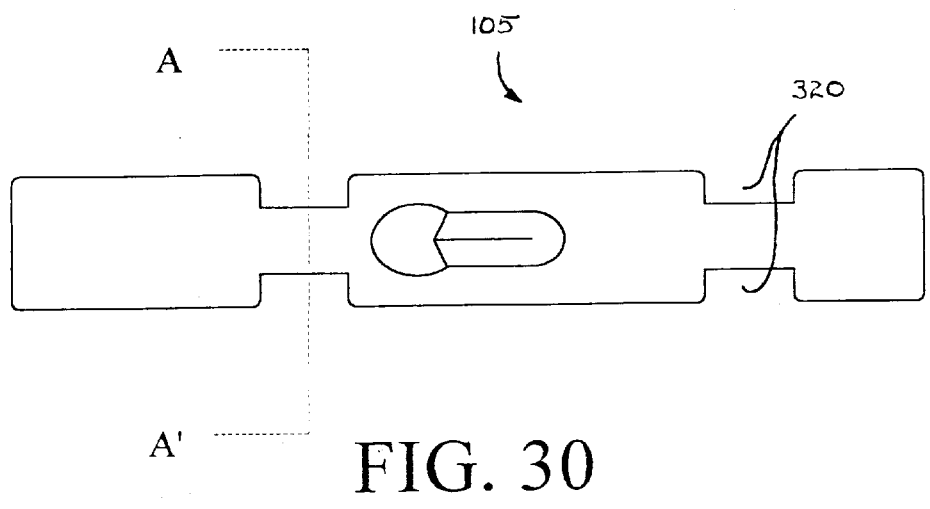
FIGS. 30, 31 and 32 show a top perspective view, an end cross-section, and a side cut-away view, respectively, of a two-position release slide pin for use with the collet 22 of FIG. 29 which eliminates the need for the hook of channel 260 without sacrificing the quick-release feature.
Figure 31:
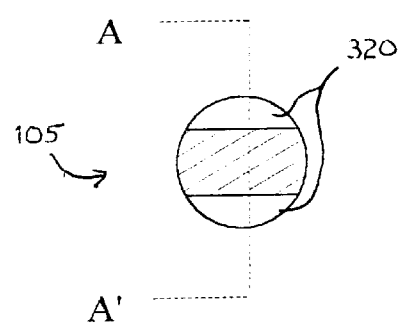
Figure 32:
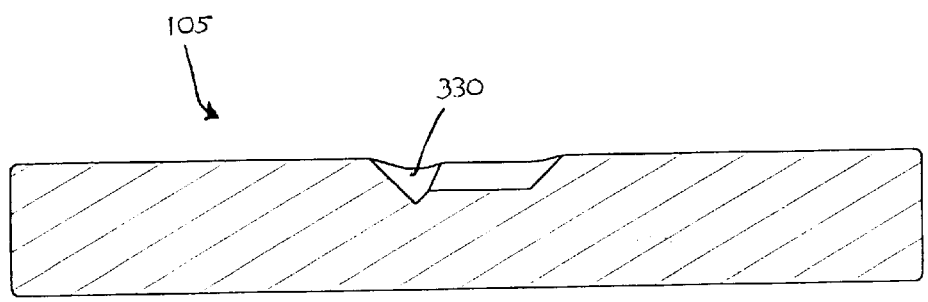

FIGS. 30, 31 and 32 show a top perspective view, an end cross-section, and a side cut-away view, respectively, of the two-position slide release pin 105 for use with the collet 322 of FIG. 29. This eliminates the need for the hook or J-lock of channel 260 without sacrificing the quick-change feature. Collet 322 can be easily and manually changed without tools by shifting pin 105. Two-position slide release pin 105 is sized for insertion in the lateral through-bore 360 in upper mounting collar 310 of collet 322. A detent channel 330 is centrally located, and this is preferably a shallow notch leading to a slightly deeper pocket.

As seen in FIG. 30 and combined with reference to FIG. 29, pin 105 incorporates opposing side notches 320 at each end which correspond to the walls of upper mounting collar 310. These side notches 320 allow the collet 333 to be removed when they are aligned with the vertical slot leading into the lateral through-bore 360 in the collet 322. Thus, when slid to an open position, the opposing side notches 320 form a narrow cross-section to allow easy insertion or removal of collet 322. However, when slid to a closed position the opposing side notches 320 form a broader cross-section to lock the collet 322 in position.

Figure 33:
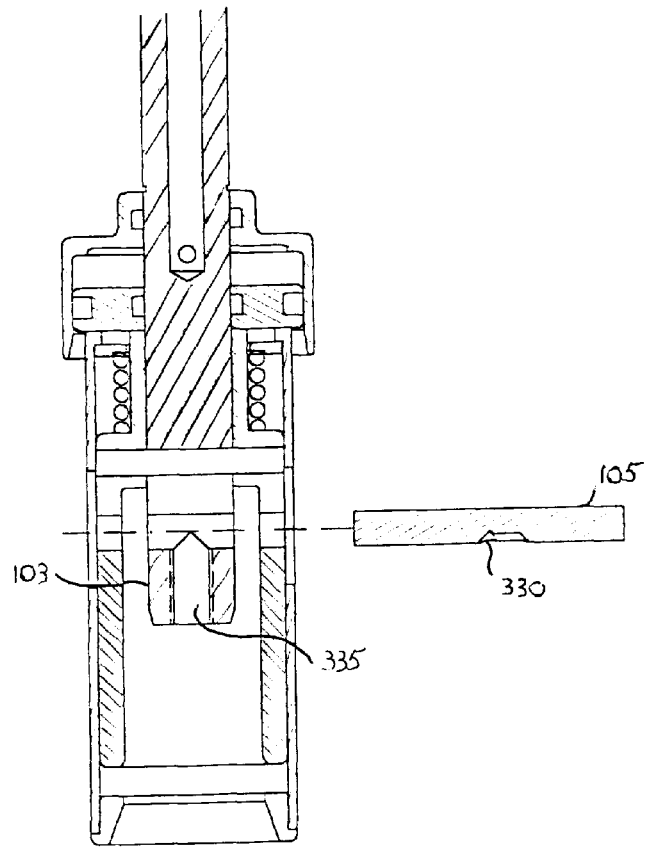
FIG. 33 is a side cut-away drawing illustrating the placement of a conventional ball-detent mechanism 140 for cooperation with the quick release pin of FIGS. 30–32 by insertion into the hollowed lower tip of Shaft 103, thereby helping to eliminate the need for the hook of channel 260 without sacrificing the quick-release feature.

FIG. 33 is a side cut-away drawing illustrating the placement of a detent mechanism for cooperation with the quick release pin 105 of FIGS. 30–32. The detent channel 330 cooperates with a detent pin 335 which can be mounted inside the lower end of Shaft 103. The detent pin 335 is a simple spring-loaded detent pin with a pointed tip as shown.

When pin 105 is inserted laterally into the piston 103, the detent pin 335 enters detent channel 330 and seats the pin 105 upon reaching the deeper pocket. Once seated in the deeper pocket of detent channel 330, the detent pin 335 holds the slide pin 105 in closed position and thereby locks collet 322 in position. The pin 105 can be conveniently and manually slid from the locked or closed position to the unlocked or open position, thereby enabling quick-change insertion/removal of collet 22 without tools. Given the two-position slide release pin 105 of FIGS. 30–32 with detent pin of FIG. 33, the collet itself need not be press and twist-on embodiment shown in FIGS. 21–28.

Figure 34:
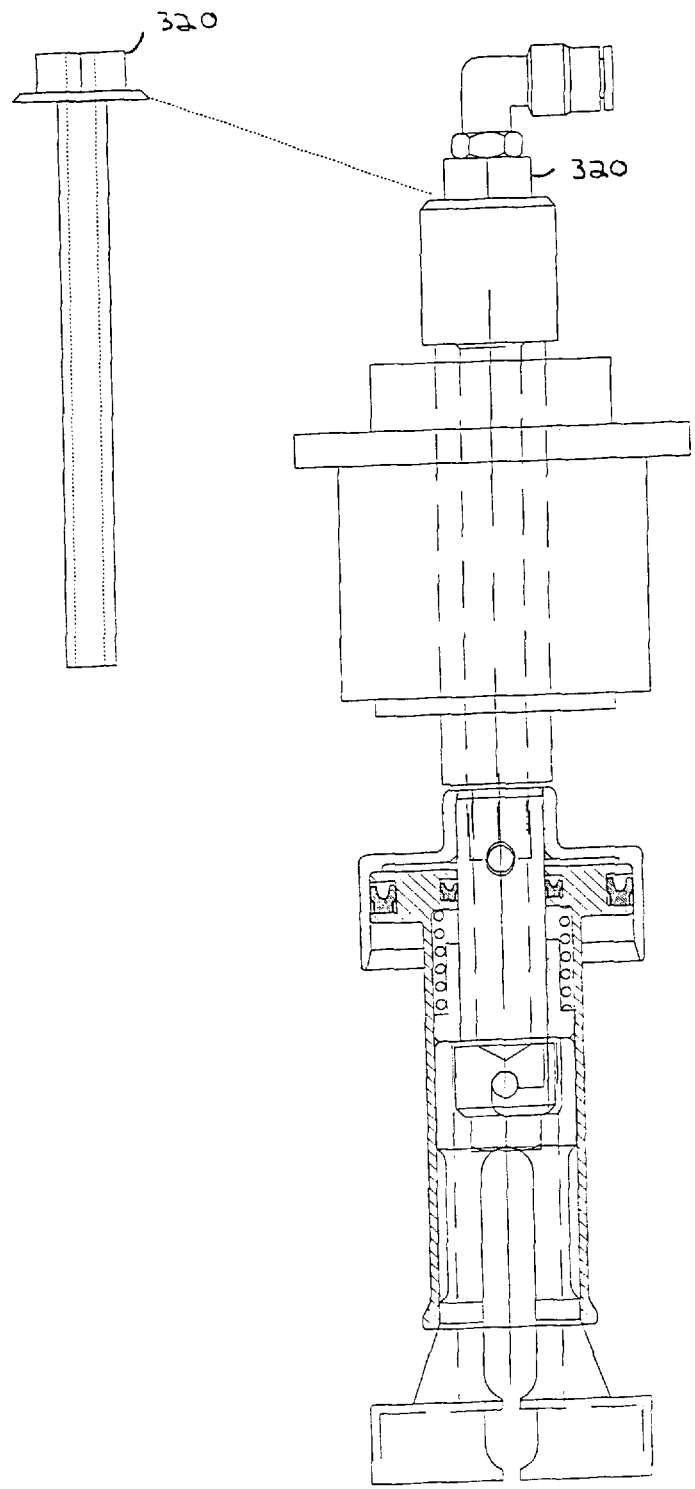
FIG. 34 illustrates the use of a "draw bolt" 320 to effect reversibility when cap removal and removal torque testing is desirable. Draw bolt 320 may be used with any of the above collet/chuck embodiments.

Another feature may be incorporated into the above-described collet chuck to facilitate reversible operation. This is significant when it is desirable to include cap removal and removal torque testing on the capping machine 10. This feature requires that the chuck 20 cannot unscrew or spin loose from the spindle shaft since the quick-change collet 22 is already locked in position by the above-described quick-release mechanisms. As shown in FIG. 34, the reversibility is accomplished with an internally threaded "draw bolt" 320 that screw-attaches to the collet chuck 20 and tightens, thereby allowing it to be pre-loaded well in excess of the working application torque by at least a factor of 10. This facilitates reversibility by far exceeding the "break-loose" torque between the existing spindle shaft and chuck shaft (the rotary spline assembly and spindle shaft are existing components of a single lane capping apparatus. The collet chuck assembly 20 itself remains unchanged but reversibility is facilitated. Draw bolt 320 may be used with any of the above-described collet/chuck embodiments.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

I claim:

1. A quick-release collet chuck for an automatic capping machine, comprising:

a shaft 103 for connection at one end to an existing drive of the capping machine, said shaft having a lengthwise through-bore and a lateral through-bore at an opposing end;

a pin 105 for insertion in the lateral through bore of said shaft;

a bell cap 102 mounted on said shaft;

a piston 101 slidably mounted on said shaft beneath said bell cap, said piston having a downwardly extending cylindrical sleeve a unitary 22 collet attached to said shaft inside the sleeve of the piston, said collet having an upper mounting collar for attachment to said shaft and a plurality of downwardly extended gripping tines each formed with a ramped bearing surface for engagement by said piston;

whereby air pressure supplied between said bell cap and piston via the lengthwise through-bore in said shaft urges said piston downward, the sleeve of said piston thereby engaging the ramped bearing surfaces of said gripping tines and closing the tines of said collet to grip a cap.

2. The quick-release collet chuck for an automatic capping machine according to claim 1, further comprising a compression spring for returning said piston to a home position after said air pressure is removed.

3. The quick-release collet chuck for an automatic capping machine according to claim 1, wherein said pin is transverse for insertion in the lateral through bore of said shaft for retaining said collet, and the upper mounting collar of said collet is defined by a hooked channel for push-and-twist locking onto said shaft and around said transverse pin.

4. The quick-release collet chuck for an automatic capping machine according to claim 1, whereby the upper mounting collar of said collet is defined by a pair of opposing holes, and said collet chuck includes a transverse pin for insertion through the holes in said upper mounting collar and the lateral through-bore at the end of said shaft, thereby locking said collet onto said shaft.

5. The quick-release collet chuck for an automatic capping machine according to claim 2, wherein said shaft is provided with a transverse pin for retaining said collet, and the upper mounting collar of said collet is defined by a hooked channel for push-and-twist locking onto said shaft and around said transverse pin, said compression spring exerting a downward pressure on said collet to insure that the collet remains hooked on the pin.

6. The quick-release collet chuck for an automatic capping machine according to claim 1, wherein said pin is a transverse pin, the upper mounting collar of said collet having a pair of opposing apertures therein, whereby said transverse pin may be inserted through the apertures in said upper mounting collar and through said shaft, thereby locking said collet onto said shaft.

7. The quick-release collet assembly according to claim 6, wherein said transverse pin is formed with a detent channel at mid-length, and said shaft is provided with an internal detent for indexing said transverse pin by engagement with said detent channel.

8. The quick-release collet assembly according to claim 7, wherein said detent channel further comprises a shallow groove leading to a deeper pocket.

9. The quick-release collet assembly according to claim 7, wherein said internal detent further comprises a spring-loaded detent pin.

10. The quick-release collet assembly according to claim 7, wherein said internal detent further comprises a spring-loaded ball detent.

* * * * *